United States Patent
Kim

(10) Patent No.: US 12,378,628 B2
(45) Date of Patent: Aug. 5, 2025

(54) WIRE ROD AND STEEL WIRE FOR SPRING, HAVING ENHANCED TOUGHNESS AND CORROSION FATIGUE PROPERTIES, AND RESPECTIVE MANUFACTURING METHODS THEREFOR

(71) Applicant: POSCO, Pohang-si (KR)

(72) Inventor: Kwan Ho Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 883 days.

(21) Appl. No.: 17/269,793

(22) PCT Filed: Feb. 22, 2019

(86) PCT No.: PCT/KR2019/002209
§ 371 (c)(1),
(2) Date: Feb. 19, 2021

(87) PCT Pub. No.: WO2020/040388
PCT Pub. Date: Feb. 27, 2020

(65) Prior Publication Data
US 2021/0180152 A1 Jun. 17, 2021

(30) Foreign Application Priority Data
Aug. 21, 2018 (KR) .................. 10-2018-0097262

(51) Int. Cl.
C21D 9/52 (2006.01)
C21D 6/00 (2006.01)
(Continued)

(52) U.S. Cl.
CPC ............. *C21D 9/525* (2013.01); *C21D 6/002* (2013.01); *C21D 6/005* (2013.01); *C21D 6/008* (2013.01);
(Continued)

(58) Field of Classification Search
CPC ........ C21D 9/525; C21D 6/002; C21D 6/005; C21D 6/008; C21D 8/065; C21D 9/02;
(Continued)

(56) References Cited

U.S. PATENT DOCUMENTS

| | | | | |
|---|---|---|---|---|
| 2007/0125456 A1* | 6/2007 | Kochi | ..................... | C22C 38/06 420/104 |
| 2010/0175795 A1* | 7/2010 | Choi | ..................... | C22C 38/50 72/200 |
| 2015/0004051 A1* | 1/2015 | Honjo | ..................... | C22C 38/48 420/110 |

FOREIGN PATENT DOCUMENTS

| CN | 101624679 B | 8/2011 | | |
|---|---|---|---|---|
| CN | 107523752 A | * 12/2017 | ............... | C21D 1/18 |

(Continued)

OTHER PUBLICATIONS

KR20090071163A Translation (Year: 2009).*
(Continued)

*Primary Examiner* — Danielle M. Carda
(74) *Attorney, Agent, or Firm* — Morgan Lewis & Bockius LLP

(57) ABSTRACT

A wire rod for springs with improved toughness and corrosion fatigue properties is disclosed. The disclosed wire rod comprises by weight percent, carbon (C): 0.4 to 0.7%, silicon (Si): 1.2 to 2.3%, manganese (Mn): 0.2 to 0.8%, chromium (Cr): 0.2 to 0.8%, and a balance of Fe and inevitable impurities, and a grain size is 13.2 μm or less, and a Charpy impact energy value is 38 J/cm² or more.

16 Claims, 6 Drawing Sheets

(51) Int. Cl.
| | |
|---|---|
| *C21D 8/06* | (2006.01) |
| *C21D 9/02* | (2006.01) |
| *C22C 38/02* | (2006.01) |
| *C22C 38/04* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *F16F 1/02* | (2006.01) |

(52) U.S. Cl.
CPC ............... *C21D 8/065* (2013.01); *C21D 9/02* (2013.01); *C22C 38/02* (2013.01); *C22C 38/04* (2013.01); *C22C 38/42* (2013.01); *C22C 38/44* (2013.01); *C22C 38/46* (2013.01); *C22C 38/48* (2013.01); *C22C 38/50* (2013.01); *F16F 1/021* (2013.01)

(58) Field of Classification Search
CPC ...... C21D 9/60; C21D 1/25; C21D 2211/004; C21D 9/5732; C21D 2211/005; C21D 2211/009; C22C 38/02; C22C 38/04; C22C 38/42; C22C 38/44; C22C 38/46; C22C 38/48; C22C 38/50; C22C 38/20; C22C 38/24; C22C 38/26; C22C 38/28; C22C 38/38; C22C 38/34; C22C 38/58; F16F 1/021; Y02P 10/25; B21B 1/16; B21B 3/00
USPC ........................................................ 148/546
See application file for complete search history.

(56) References Cited

FOREIGN PATENT DOCUMENTS

| | | | | |
|---|---|---|---|---|
| CN | 107523752 B | 9/2019 | | |
| EP | 2832891 A1 * | 2/2015 | ............... | C21D 8/06 |
| JP | H11-80895 A | 3/1999 | | |
| JP | 2001-152289 A | 6/2001 | | |
| JP | 2009-046763 A | 3/2009 | | |
| JP | 2017-218659 A | 12/2017 | | |
| KR | 10-2009-0009739 A | 1/2009 | | |
| KR | 20090071163 A * | 7/2009 | ............... | C21D 8/06 |
| KR | 10-2011-0075316 A | 7/2011 | | |
| KR | 10-1096888 B1 | 12/2011 | | |
| KR | 20180072965 A * | 7/2018 | ............... | C21D 8/06 |
| WO | 2017/122827 A1 | 7/2017 | | |
| WO | 2019/066328 A1 | 4/2019 | | |

OTHER PUBLICATIONS

KR-20180072965-A Translation (Year: 2018).*
CN-107523752-A Translation (Year: 2017).*
European Office Action dated Jul. 14, 2022 issued in European Patent Application No. 19851831.8.
Chinese Office Action dated Nov. 18, 2021 issued in Chinese Patent Application No. 201980067791.0 (with partial English translation).
European Communication dated Mar. 24, 2023 issued in European Patent Application No. 19851831.8.
Indian Office Action dated Apr. 1, 2022 issued in Indian Patent Application No. 202117008491 (with English translation).
Japanese Office Action dated Apr. 5, 2022 issued in Japanese Patent Application No. 2021-509851 (with English translation).
Chinese Office Action dated Jun. 9, 2022 issued in Chinese Office Action No. 201980067791.0 (with English translation).
Z. Yingbo, et al., Foreign Steel for Springs Production Technology, Oct. 31, 1993, pp. 50-51 (relates to Claims 1-10).
Extended European Search Report dated Jul. 30, 2021 issued in European Patent Application No. 19851831.8.
International Search Report dated Jun. 11, 2019 issued in International Patent Application No. PCT/KR2019/002209 (with English translation).
Korean Office Action dated Oct. 1, 2019 issued in Korean Patent Application No. 10-2018-0097262.
Indian Communication dated Oct. 30, 2023 issued in Indian Patent Application No. 202117008491 (with English translation).
European Communication dated Nov. 23, 2023 issued in European Patent Application No. 19851831.8.

* cited by examiner

[FIG. 1]
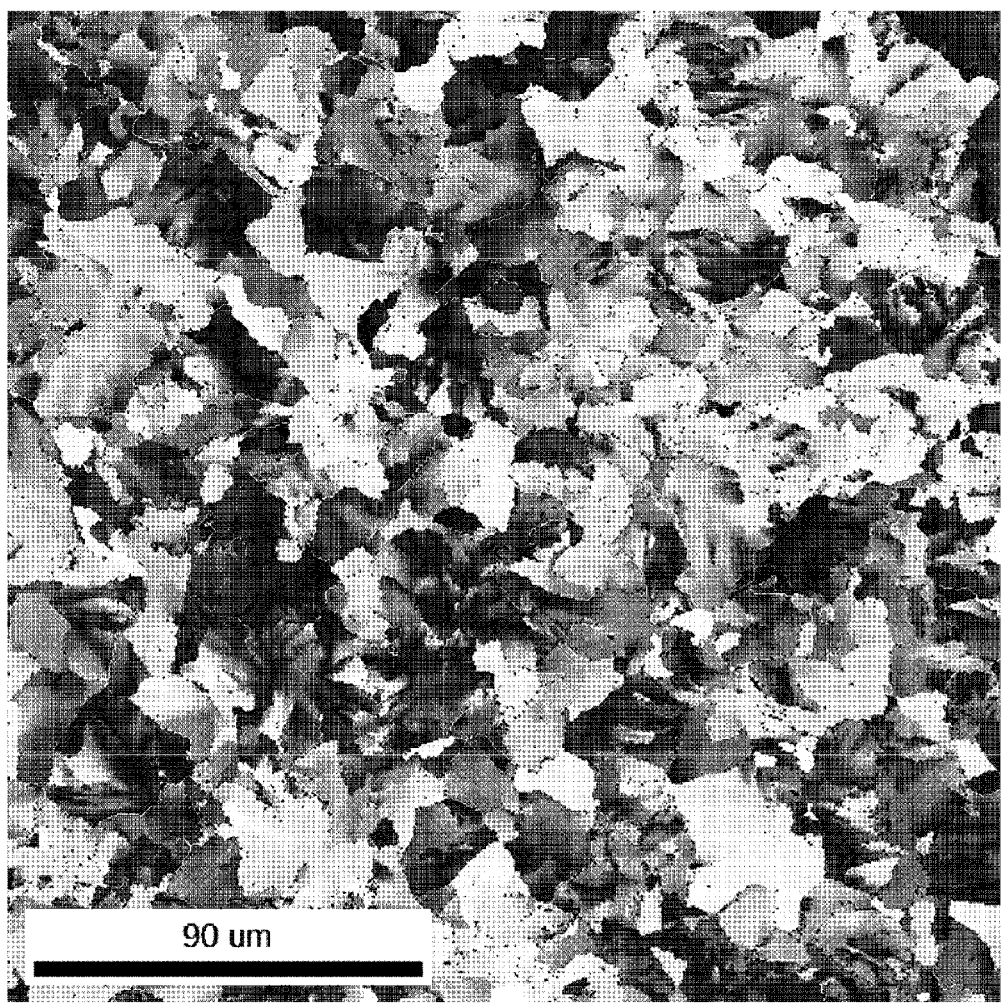

[FIG. 2]
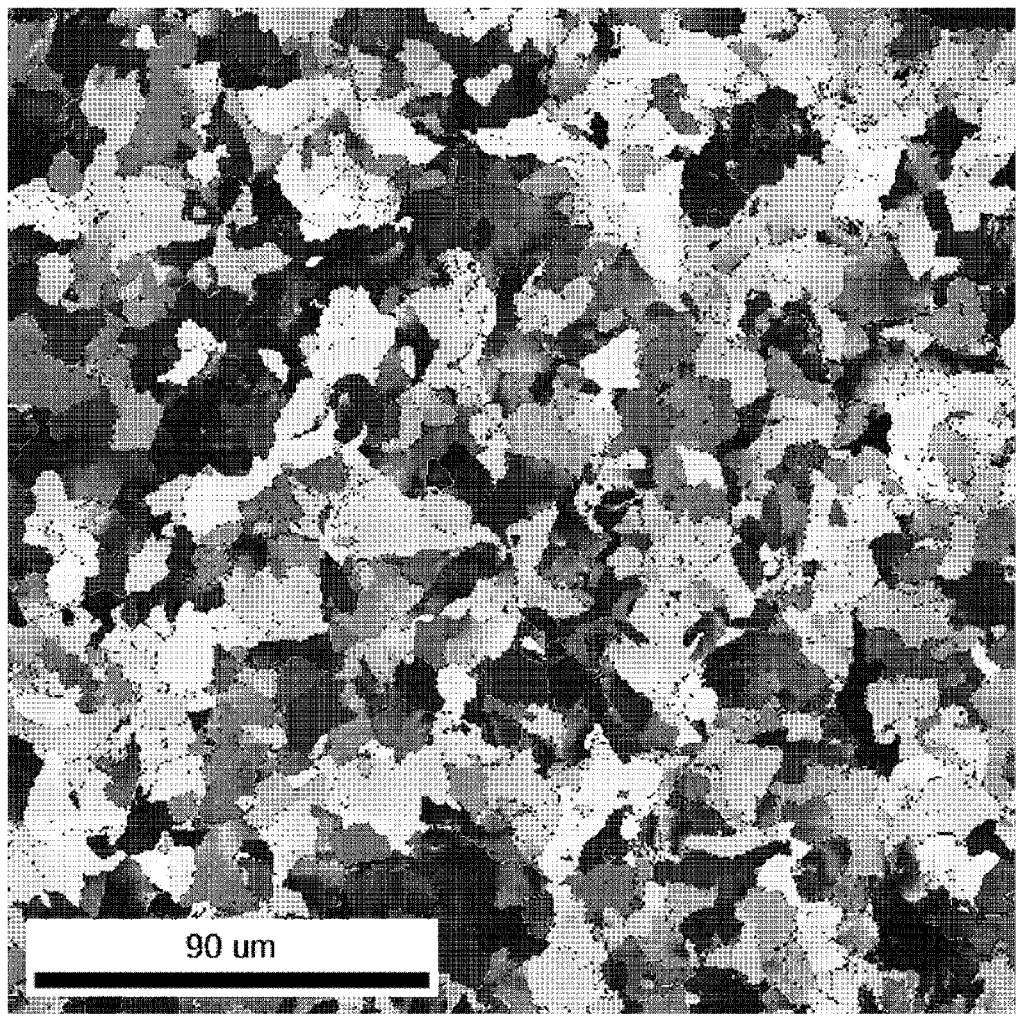

[FIG. 3]
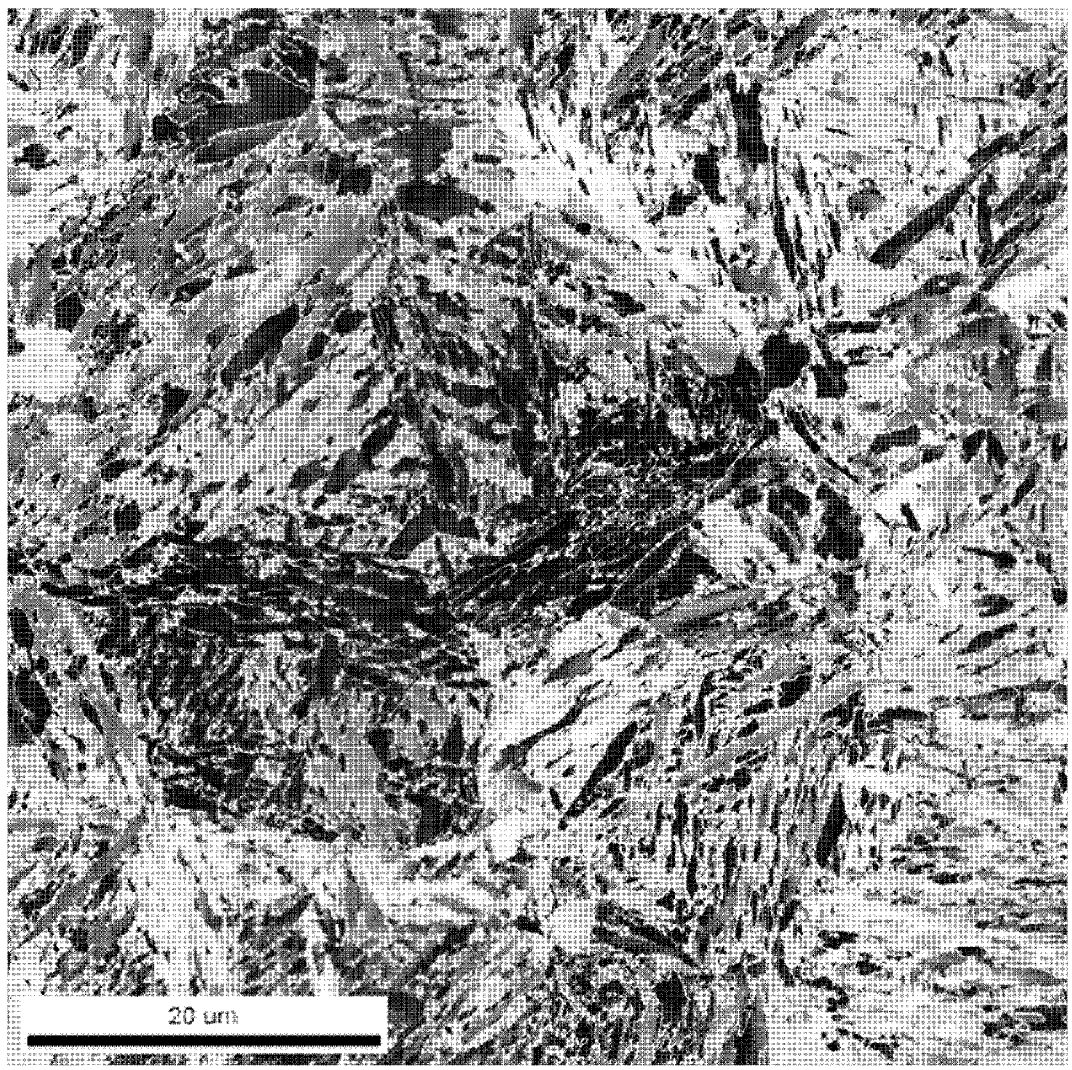

[FIG. 4]
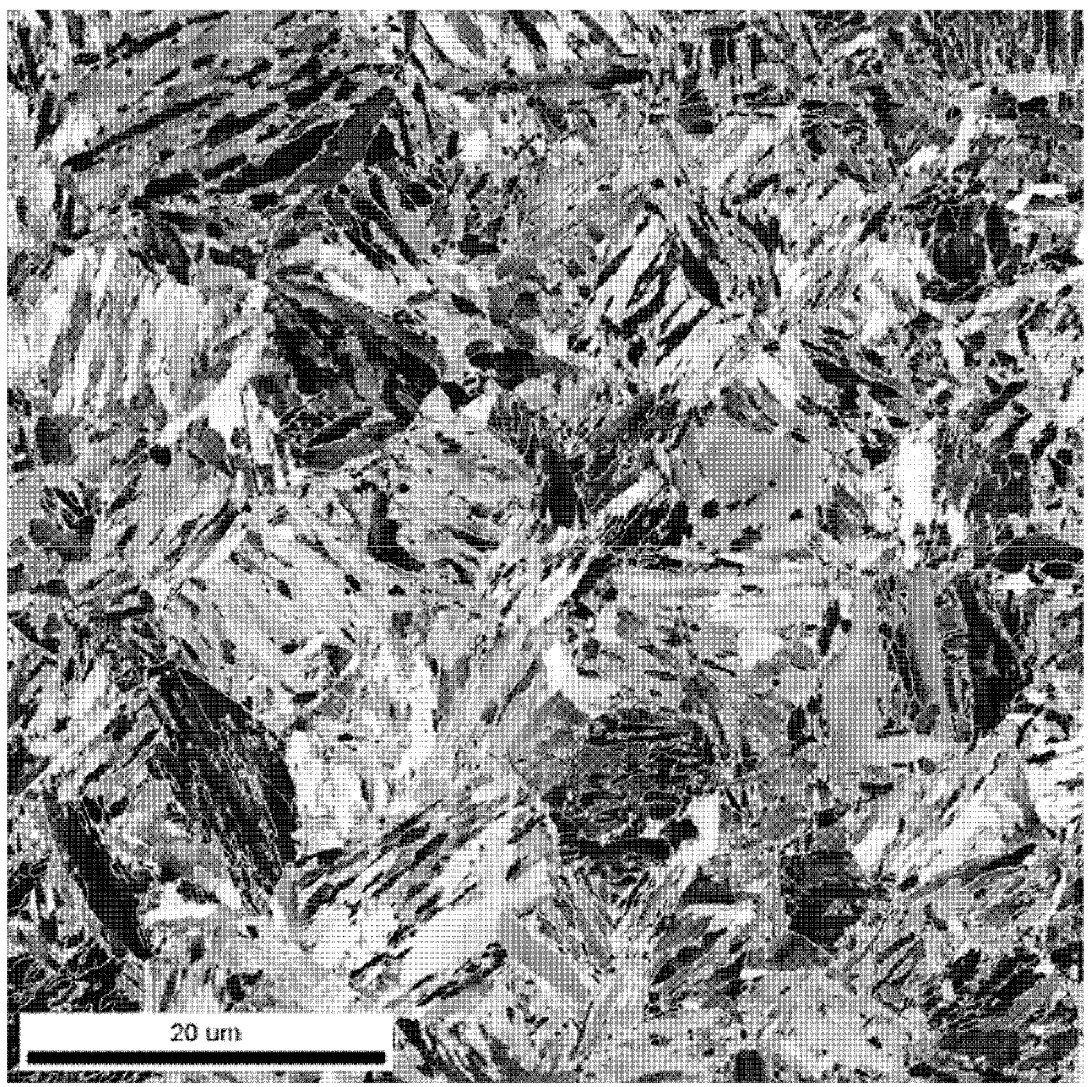

[FIG. 5]
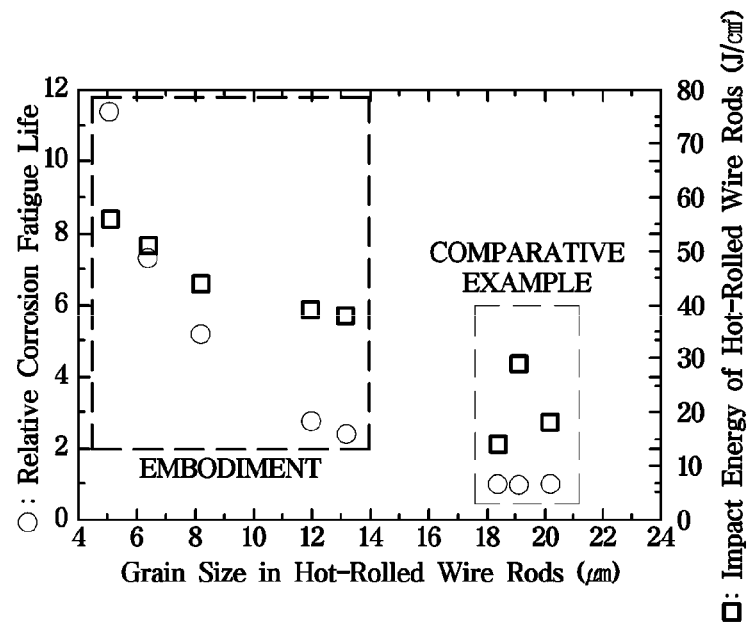

[FIG. 6]
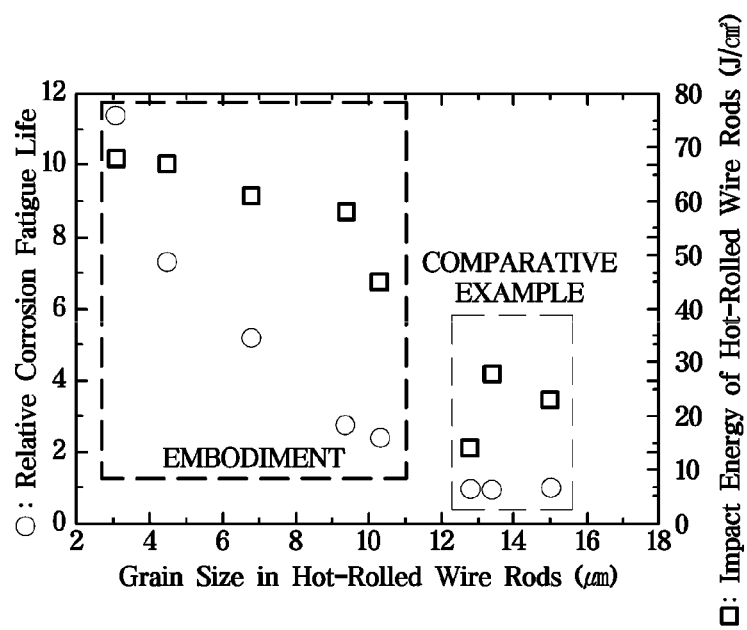

WIRE ROD AND STEEL WIRE FOR SPRING, HAVING ENHANCED TOUGHNESS AND CORROSION FATIGUE PROPERTIES, AND RESPECTIVE MANUFACTURING METHODS THEREFOR

CROSS-REFERENCE OF RELATED APPLICATIONS

This application is the U.S. National Phase under 35 U.S.C. § 371 of International Patent Application No. PCT/KR2019/002209, filed on Feb. 22, 2019, which in turn claims the benefit of Korean Application No. 10-2018-0097262, filed on Aug. 21, 2018, the entire disclosures of which applications are incorporated by reference herein.

TECHNICAL FIELD

The present disclosure relates to a wire rod for springs, a steel wire for springs, and a manufacturing method thereof, and in particular, to a wire rod for springs, a steel wire for springs capable of securing strength and having improved toughness and corrosion fatigue properties.

BACKGROUND ART

In recent years, a demand for lightness of a material for a vehicle has greatly increased in order to improve fuel efficiency of a vehicle, in particular, a suspension spring has been designed to be manufactured using a high strength material having strength of 1800 MPa or higher after quenching and tempering in order to respond to the demand for the lightness.

A predetermined wire rod is produced through hot rolling by using steel for a spring, and then, in a case of a hot-rolled spring, a heating process, a forming process, and a quenching and tempering process are sequentially performed, and in a case of a cold-rolled spring, a drawing process and a quenching and tempering process are sequentially performed, thereby forming a spring.

In general, when high strength of a material is achieved, toughness is degraded and crack sensitivity is increased due to grain boundary embrittlement or the like. Thus, although the high strength of the material is achieved, when corrosion resistance of the material is degraded, a component that is exposed to the outside, such as a suspension spring of a vehicle, has a corrosion fit formed at a portion from which paint is peeled off. Therefore, the component may be damaged at an early stage due to fatigue cracks spreading from the corrosion pit.

In particular, a corrosive environment of a suspension spring becomes more severe due to an increase in spraying of a snow-melting agent used to prevent a road surface from freezing in winter, therefore, a demand for steel for a spring having high strength and excellent corrosion fatigue resistance properties has increased.

Corrosion fatigue of a suspension spring is a phenomenon in which paint of a surface of the spring is peeled off by pebbles on a road surface or foreign matters, a material of a portion from which the paint is peeled off is exposed to outside to cause a pitting corrosion reaction, a generated corrosion pit is gradually grown, cracks are generated and spread from the corrosion pit, hydrogen flowing from the outside is concentrated on the cracks at some point to cause hydrogen embrittlement, and thus the spring is broken.

In order to improve corrosion fatigue resistance of a spring, a method of increasing types and contents of alloy elements has been used in the related art. In Patent Document 1, a content of Ni is increased to 0.55 wt % to improve corrosion resistance, thereby improving a corrosion fatigue life of a spring. In Patent Document 2, a content of Si is increased to obtain fine carbide to be precipitated during tempering, thereby increasing corrosion fatigue strength.

In addition, in Patent Document 3, a Ti precipitate, which is a strong hydrogen trapping site, and V, Nb, Zr and Hf precipitates, which are weak hydrogen trapping sites, are adequately combined to improve hydrogen-delayed fracture resistance, thereby improving a corrosion fatigue life of a spring.

However, Ni is a very expensive element, and when a large amount of Ni is added, material costs increase. Since Si is a representative element that causes decarburization, an increase in content of Si may be significantly dangerous. Elements constituting a precipitate, such as Ti, V, and Nb, may degrade a corrosion fatigue life of a spring because the elements crystallize coarse carbonitrides from a liquid when the material is solidified.

Meanwhile, in order to increase strength of a spring, a method of adding an alloy element and a method of lowering a tempering temperature have been used in the related art. As the method of increasing strength of a spring by adding an alloy element, a method of increasing a quenching hardness by using C, Si, Mn, Cr, and the like is basically used. Strength of a steel material is increased through a rapid cooling and a tempering heat treatment by using Mo, Ni, V, Ti, Nb, and the like that are expensive alloy elements. However, in the case of these techniques, a cost price may increase.

In addition, a method of increasing strength of a steel material by changing heat treatment conditions in a general component system without changing of an alloy composition is used. That is, in a case where tempering is performed at a low temperature, the strength of the material is increased. However, when a tempering temperature is lowered, an area reduction rate of the material is decreased, which may cause degradation in toughness. As a result, a breakage during formation and use of the spring may occur at an early stage. Therefore, there is a need to develop a steel for springs with improved toughness and corrosion fatigue properties and capable of securing strength.

RELATED ART DOCUMENT (Patent Document 1) Japanese Patent Laid-Open Publication No. 2008-190042
(Patent Document 2) Japanese Patent Laid-Open Publication No. 2011-074431
(Patent Document 3) Japanese Patent Laid-Open Publication No. 2005-023404

DISCLOSURE

Technical Problem

Embodiments of the present disclosure is to provide a wire rod, a steel wire for springs, and their manufacturing method, with improved corrosion fatigue properties capable of securing toughness.

In accordance with an aspect of the present disclosure, a wire rod for springs with improved toughness and corrosion fatigue properties includes: by weight percent, carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities, and a grain size is 13.2 μm or less, and a Charpy impact energy value is 38 J/cm² or more.

In accordance with an aspect of the present disclosure, a microstructure of the wire rod may be, by an area fraction, 5 to 37% of ferrite, and the remainder may be a mixed structure including pearlite.

In accordance with an aspect of the present disclosure, the wire rod may further include one or more elements selected from among vanadium (V): 0.01 to 0.2%, niobium (Nb): 0.01 to 0.1%, titanium (Ti): 0.01 to 0.15%, and molybdenum (Mo): 0.01 to 0.4%.

In accordance with an aspect of the present disclosure, the wire rod may further include one or more elements selected from among copper (Cu): 0.01 to 0.4% and nickel (Ni): 0.01 to 0.6%.

In accordance with another aspect of the present disclosure, a method of manufacturing a wire rod for springs with improved toughness and corrosion fatigue properties includes: manufacturing a billet including carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities; heating the billet at 800 to 950° C.; and finishing rolling the heated billet at 700 to 1,100° C. and winding to manufacture a wire rod.

In accordance with an aspect of the present disclosure, the billet may further include one or more elements selected from among vanadium (V): 0.01 to 0.2%, niobium (Nb): 0.01 to 0.1%, titanium (Ti): 0.01 to 0.15%, and molybdenum (Mo): 0.01 to 0.4%.

In accordance with an aspect of the present disclosure, the billet may further include one or more elements selected from among copper (Cu): 0.01 to 0.4% and nickel (Ni): 0.01 to 0.6%.

In accordance with an aspect of the present disclosure, a cooling start temperature of the wire rod may be 820° C. or less.

In accordance with still another aspect of the present disclosure, a steel wire for springs with improved toughness and corrosion fatigue properties includes: by weight percent, carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities, and a grain size is 10.3 μm or less, and a Charpy impact energy value is 45 J/cm² or more.

In accordance with still another aspect of the present disclosure, a method of manufacturing a steel wire for springs with improved toughness and corrosion fatigue properties includes: drawing a wire rod including carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities to manufacture a steel wire; austenitizing the steel wire by heating the steel wire in a range of 850 to 1,000° C. and then maintaining it for at least 1 second; and quenching the austenitized steel wire in a range of 25 to 80° C. and tempering in a range of 350 to 500° C.

Advantageous Effects

As is apparent from the above, according to an exemplary embodiment in the present disclosure, by reducing a grain size, toughness is improved, and at the same time a depth of a corrosion pit becomes shallow, as the path through which the crack generated from the corrosion pit is spread and the path through which hydrogen introduced from the outside diffuses to the crack area are increased, it is possible to provide a wire rod and a steel wire for springs with excellent corrosion fatigue properties.

DESCRIPTION OF DRAWINGS

FIGS. 1 and 2 are microstructure photographs taken with an Electron Backscatter Diffraction apparatus to measure the grain size of the wire rod in Comparative Example 1 and Inventive Example 3, respectively.

FIGS. 3 and 4 are microstructure photographs taken with an Electron Backscatter Diffraction apparatus to measure the grain size of the steel wire in Comparative Example 1 and Inventive example 3, respectively.

FIG. 5 is a graph showing a correlation between grain size, toughness, and relative corrosion fatigue life of a wire rod for springs according to an embodiment of the present disclosure.

FIG. 6 is a graph showing a correlation between grain size, toughness, and relative corrosion fatigue life of a steel wire for springs according to an embodiment of the present disclosure.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

Also, when a part "includes" or "comprises" an element, unless there is a particular description contrary thereto, the part may further include other elements, not excluding the other elements.

An expression used in the singular encompasses the expression of the plural, unless it has a clearly different meaning in the context.

Hereinafter, embodiments according to the present disclosure will be described in detail with reference to the accompanying drawings.

The inventor of the present disclosure was able to obtain the following findings in providing a wire rod for springs, while examining various factors affecting a corrosion resistance of spring steel, and focusing on a fact that corrosion fatigue of springs is a phenomenon in which paint of a surface of a spring is peeled off, and a corrosion pit occurs, and the corrosion pit from which cracks are generated and spread from the corrosion pit, and hydrogen flowing from the outside is concentrated in the crack area and thus the spring is broken.

The inventor has found that if a grain size of wire rod and steel wire for springs is reduced by optimizing component compositions and manufacturing conditions of steel, toughness may be improved and a depth of the corrosion pit may become shallow, in addition, a path through which cracks generated from the corrosion pit are spread and a path through which hydrogen flowing from the outside travels to diffuse to the crack area is increased, and thus a time to fracture is delayed, which can improve corrosion fatigue properties, thereby completing the present disclosure.

In accordance with an aspect of the present disclosure, a wire rod for springs with improved toughness and corrosion fatigue properties includes: by weight percent, carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities.

Hereinafter, the reason for numerical limitation of alloy element contents in the embodiments of the present disclosure will be described. Hereinafter, unless otherwise specified, the unit is % by weight.

The content of C is 0.4 to 0.7%.

Carbon (C) is an essential element added to secure the strength of a spring, and may be added at least 0.4%. However, if the content is excessive, a twin martensite structure is formed during quenching and heat treatment, cracks of a material are generated, and a fatigue life is degraded, defect sensitivity is increase, and when a corrosion pit occurs, the fatigue life or a fracture stress is degraded, there is a problem that the fatigue life or the fracture stress decreases, so the upper limit of the content of C may be limited to 0.7%.

The content of Si is 1.2 to 2.3%.

Silicon (Si) is an element that is dissolved in ferrite to enhance strength and improve deformation resistance, and its lower limit of the content may be limited to 1.2%. More preferably, it may be added at least 1.4%. However, if the content is excessive, not only the effect of improving deformation resistance is saturated, but also surface decarburization occurs during heat treatment, thereby the upper limit of the content of Si may be limited to 2.3%.

The content of Mn is 0.2 to 0.8%.

Manganese (Mn) is an element that serves to secure strength by improving the hardenability of steel, and may be added 0.2% or more. However, if the content is excessive, the hardenability is excessively increased, and the hard structure is likely to occur during cooling after hot rolling, and the formation of MnS inclusions increases, and corrosion fatigue properties may be reduced, so the upper limit of the content of Mn may be limited to 0.8%.

The content of Cr is 0.2 to 0.8%.

Chromium (Cr) is an element useful for preventing oxidation resistance, temper softening properties, and surface decarburization and securing hardenability, it may be added 0.2% or more. However, if the content is excessive, there is a problem that the strength is rather inferior due to a decrease in deformation resistance, and the upper limit of the content of Cr may be limited to 0.8%.

In addition, a wire rod for springs with improved toughness and corrosion fatigue properties according to an embodiment of the present disclosure, in addition to the above-described alloy composition, one or more of V, Nb, Ti, and Mo among elements forming carbonitrides may be further included.

The content of V is 0.01 to 0.2%.

Vanadium (V) is an element that contributes to strength improvement and crystal grain refinement. In addition, it combines with carbon (C) or nitrogen (N) to form carbonitrides, which act as a trap site for hydrogen, and it inhibits hydrogen infiltration and reduces corrosion, it may be added by 0.01% or more. However, if the content is excessive, the manufacturing cost increases, so the upper limit of the content of V may be limited to 0.2%.

The content of Nb is 0.01 to 0.1%.

Niobium (Nb) is an element that forms carbon or nitrogen and carbonitrides, contributing to microstructure, and acts as a trap site for hydrogen, and may be added by 0.01% or more. However, if the content is excessive, coarse carbonitride is formed and the ductility of the steel material is reduced, and the upper limit of the content of Nb may be limited to 0.1%.

The content of Ti is 0.01 to 0.15%.

Titanium (Ti) combines with carbon (C) or nitrogen (N) to form carbonitrides, and the generated carbonitrides act as a trap site for hydrogen, suppressing hydrogen infiltration in the inside of the steel, reducing the occurrence of corrosion, and it improves spring properties by causing precipitation hardening action. In addition, since Ti improves strength and toughness through particle refinement and precipitation reinforcement, it may be added by 0.01% or more.

However, if the content is excessive, the manufacturing cost increases rapidly and the effect of improving spring properties due to precipitates is saturated. In addition, the amount of coarse alloy carbides not dissolved in the base material increases during austenite heat treatment, which lowers the fatigue properties and precipitation reinforcement effect, so the upper limit of the content of Ti is may be limited 0.15%.

The content of Mo is 0.01 to 0.4%.

Molybdenum (Mo) combines with carbon (C) or nitrogen (N) to form carbonitrides, the generated carbonitrides contribute to the microstructure and act as a trap site for hydrogen.

In order to effectively exhibit the above effect, it is preferable to add 0.01% or more of Mo. However, if the content is excessive, the hard structure is likely to occur during cooling after hot rolling, and coarse carbonitrides are formed, reducing the ductility of the steel, therefore the upper limit of the content of Mo may be limited to 0.4%.

In addition, the wire rod for springs with improved toughness and corrosion fatigue properties according to an embodiment of the present disclosure, may further include at least one of Cu and Ni.

The content of Cu is 0.01 to 0.4%.

Copper (Cu) is an element that improves corrosion resistance, and may be added 0.01% or more. However, if the content is excessive, the brittle properties is deteriorated during hot rolling, causing problems such as cracking, so the upper limit of the content of Cu may be limited to 0.4%.

The content of Ni is 0.01 to 0.6%.

Nickel (Ni) is an element added to improve hardenability and toughness, it may be added at least 0.01%. However, if the content is excessive, the residual austenite content increases to reduce the fatigue life, a rapid increase in manufacturing cost may be caused by the high-priced Ni properties, and the upper limit of the content of Ni may be limited to 0.6%.

The remaining component of the present disclosure is iron (Fe). However, in the normal manufacturing process, impurities that are not intended from the raw material or the surrounding environment can be inevitably mixed, and therefore cannot be excluded. Since these impurities are known to anyone skilled in the ordinary manufacturing process, they are not specifically mentioned in this specification.

The microstructure of the wire rod of the present disclosure that satisfies the above-described alloy composition is made of a mixed structure of ferrite and pearlite, and the pearlite structure is again divided into colonies in which cementite has one direction. At this time, when the grain size of a wire rod is measured with an Electron BackScatter Diffraction (EBSD) apparatus, the size is measured on average without distinction between ferrite and colony.

In the wire rod of the present disclosure, which satisfies the alloy composition described above, the microstructure phase fraction is by an area ratio, ferrite is 5 to 37%, and the remainder is pearlite, and bainite or martensite does not exist. In addition, the colony size of pearlite is 1.7~5.6 μm.

It is preferable that the average grain size of the wire rod of the present disclosure that satisfies the above-described alloy composition is 13.2 μm or less.

A wire rod having the grain size as described above may be obtained by controlling the aforementioned alloy composition and optimizing the wire rod rolling and cooling processes to be described later.

In order to reduce the grain size of wire rod for springs, the grain size of the billet, which is a material before rolling, is reduced, and at the same time, the finishing rolling temperature, which is the point immediately before the start of cooling after rolling, is important. Specifically, by controlling the heating temperature of the billet, the grain size of the billet, which is the material before rolling, is refined, and simultaneously the austenite grain size may be effectively controlled by controlling the finishing rolling temperature.

Hereinafter, a method of manufacturing a wire rod for springs with improved toughness and corrosion fatigue properties, which is another aspect of the present disclosure, will be described in detail.

The wire rod for springs of the present disclosure may be manufactured, after a billet having the above-described alloy composition is manufactured, through reheating—wire rod rolling—cooling process.

Particularly, a method of manufacturing a wire rod for springs in accordance with another aspect of the present disclosure may include manufacturing a billet satisfying the alloy composition described above; heating the billet at 800 to 950° C.; finishing rolling the heated billet at 700 to 1,100° C. and winding to manufacture a wire rod; and cooling the wire rod at cooling rate of 5° C./s or less.

After manufacturing the billet, it is preferable to undergo a heating step of homogenizing the billet. Through the heating process, coarsening of the grain size of the billet may be prevented.

For this purpose, it is preferable to heat the billet in a temperature range of 800 to 950° C. If the heating temperature is less than 800° C., the load of the rolling roll increases, and all the coarse carbides generated during casting are not dissolved, so that the alloy elements cannot be uniformly distributed in the austenite, on the other hand, when the temperature exceeds 950° C., the grains of the billet forms coarsely, so even if hot rolling of the wire rod under the same rolling conditions, it is difficult to secure the grain size of the targeted level in the final wire rod.

Subsequently, the heated billet is subjected to finishing rolling at 700 to 850° C. to manufacturing a wire rod. The finishing rolling temperature is an important factor that finally determines the grain size of the wire rod because cooling starts immediately afterwards. When the finishing rolling temperature is less than 700° C., the load of the rolling roll is increased, on the other hand, when the temperature exceeds 850° C., the austenite grain size before the start of cooling increases, and the grain size becomes coarse after the final cooling, which may reduce ductility.

Thereafter, the wire rod is subjected to winding and cooling at a cooling rate of 5° C./s or less. It is preferable to manufacture the wire rod having a pearlite structure through the cooling.

The cooling rate after winding is an important factor because depending on the range, the hard structure such as bainite or martensite may be formed, or decarburization may occur severely without completing the transforming pearlite after ferrite is created.

If the hard structure is created during cooling, the material is disconnected or the drawing becomes impossible in the process of drawing a wire rod to obtain a steel wire for springs of an appropriate diameter. In addition, when decarburization occurs severely, the hardness of the surface portion is lowered, thereby reducing the corrosion fatigue properties of the spring.

If the cooling rate exceeds 5° C./s, there is a problem in that the hard structure is generated during cooling and a sufficient time for the transformation of pearlite to be completed may not be secured, in the present disclosure, therefore, the cooling rate after winding is limited to 5° C./s or less.

At this time, cooling may be started in a temperature range of 820° C. or less. The cooling start temperature means the temperature after finishing hot rolling, the lower the temperature, the more preferable. If the cooling start temperature exceeds 820° C., since sufficient deformation energy may not be supplied, it is difficult to refine crystal grain.

Hereinafter, a method of manufacturing a steel wire for springs with improved toughness and corrosion fatigue properties, which is still another aspect of the present disclosure, will be described in detail.

In accordance with still another aspect of the present disclosure, a method of manufacturing a steel wire for springs may include drawing the wire rod to manufacture a steel wire; austenitizing the steel wire by heating the steel wire in a range of 850 to 1,000° C. and then maintaing it for at least 1 second; and quenching the austenitized steel wire in a range of 25 to 80° C. and tempering in a range of 350 to 500° C.

The wire rod thus obtained is drawn to obtain a steel wire.

Thereafter, an austenitizing step is performed. The steel wire is heat treated at a temperature in a range of 850 to 1,000° C. At this time, it is preferable that the heat treatment maintaing time is 1 second or more.

In recent years, induction heat treatment facilities are increasingly used to manufacture steel wire for springs, in this case, if the heat treatment maintaining time is less than 1 second, the ferrite and pearlite structures may not be sufficiently heated and thus may not be transformed into austenite.

Subsequently, the austenitized steel wire is subjected to quenching in a range of 25 to 80° C., and heat treatment (tempering) in a range of 350 to 500° C. The heat treatment is a step for securing the mechanical properties desired by the present disclosure, and is required to secure toughness and strength.

If the tempering temperature is less than 350° C., toughness is not secured and there is a risk of damage in forming and product conditions, if it exceeds 500° C., it may be difficult to secure high strength due to a sharp decrease in strength.

Hereinafter, the present disclosure will be described in more detail through embodiments. However, it should be noted that the following examples are only intended to illustrate the present disclosure in more detail and not to limit the scope of the present disclosure. This is because the scope of the present disclosure is determined by matters described in the claims and matters reasonably inferred therefrom.

After preparing a cast piece having an alloy composition shown in Table 1 below, through a series of casting processes, each wire rod was manufactured through a reheating—hot rolling—cooling process under the conditions shown in Table 2 below.

Thereafter, the wire rod was subjected to an austenitizing step of heating at 975° C. for 15 minutes, and then quenched by immersing in oil at 70° C. Subsequently, tempering treatment was performed at 390° C. for 30 minutes to manufacture a steel wire.

TABLE 1

| Classification | C | Si | Mn | Cr | V | Ti | Nb | Mo | Cu | Ni |
|---|---|---|---|---|---|---|---|---|---|---|
| Inventive example 1 | 0.55 | 1.51 | 0.67 | 0.69 | — | — | — | — | — | — |
| Inventive example 2 | 0.52 | 1.49 | 0.68 | 0.62 | 0.10 | — | — | — | — | 0.27 |
| Inventive example 3 | 0.61 | 1.65 | 0.56 | 0.58 | — | 0.03 | 0.02 | 0.12 | 0.17 | 0.21 |
| Inventive example 4 | 0.53 | 1.50 | 0.69 | 0.63 | — | — | — | — | — | — |
| Inventive example 5 | 0.51 | 1.52 | 0.40 | 0.31 | 0.09 | — | 0.02 | 0.11 | 0.21 | 0.22 |
| Comparative example 1 | 0.61 | 1.48 | 0.43 | 0.33 | 0.11 | — | 0.03 | — | 0.18 | 0.43 |
| Comparative example 2 | 0.52 | 1.64 | 0.55 | 0.51 | — | 0.02 | 0.02 | — | 0.20 | 0.26 |
| Comparative example 3 | 0.53 | 2.25 | 0.52 | 0.29 | 0.12 | — | 0.02 | 0.12 | — | 0.28 |

TABLE 2

| Classification | Reheating temperature (° C.) | Finishing hot rolling (° C.) | Cooling start temperature (° C.) | Cooling rate (° C./s) |
|---|---|---|---|---|
| Inventive example 1 | 941 | 774 | 751 | 0.8 |
| Inventive example 2 | 918 | 840 | 819 | 2.0 |
| Inventive example 3 | 885 | 829 | 804 | 4.8 |
| Inventive example 4 | 832 | 712 | 706 | 0.7 |
| Inventive example 5 | 859 | 803 | 778 | 3.3 |
| Comparative example 1 | 1025 | 841 | 835 | 1.5 |
| Comparative example 2 | 940 | 874 | 860 | 3.2 |
| Comparative example 3 | 924 | 836 | 828 | 5.8 |

The grain size of the wire rod, the presence or absence of the hard structure, a Charpy U-notch energy and the grain size of the steel wire, the Charpy impact energy, the tensile strength and the relative corrosion fatigue life after quenching and tempering heat treatment are shown in Table 3 below.

The grain size was measured using an Electron Backscatter Diffraction (EBSD) apparatus.

Charpy impact energy was measured by processing an impact specimen according to ASTM E23 standard.

Tensile strength is measured by performing a tensile test after following the above-described steel wire manufacturing method, after processing the hot-rolled wire rod into a tensile specimen according to ASTM E8 standard.

For the relative corrosion fatigue life, A cycle in which the tempered steel wire specimen was put into a salt water spray tester, 5% salt water was sprayed at an atmosphere of 35° C. for 4 hours, the steel wire was dried at an atmosphere of a temperature of 25° C. and a humidity of 50% for 4 hours, and the steel wire was wet at an atmosphere of 40° C. for 16 hours until the humidity became 100% was repeated 14 times, and then a rotary bending fatigue test was performed, thereby measuring the corrosion fatigue life. At this time, a speed of the fatigue test was 3,000 rpm, a weight applied to the specimen was 40% of the tensile strength, each 10 specimen were tested, an average value of fatigue lives of 8 specimens excluding the specimen having the highest fatigue life and the specimen having the lowest fatigue life was calculated, and the obtained average value was defined as a corrosion fatigue life of the specimen. In Table 3 below, when the corrosion fatigue life of Comparative Example 1 is 1, the relative corrosion fatigue life of the remaining specimens is shown.

TABLE 3

| | Wire rod | | | | | | Steel wire | | | |
|---|---|---|---|---|---|---|---|---|---|---|
| | | | | | | | | | Tensile strength | |
| | Grain size (μm) | Charpy U-notch energy (J/cm$^2$) | Phase fraction (%) | | | Pearlite colony size (μm) | Grain size (μm) | Charpy U-notch energy (J/cm$^2$) | after quenching and tempering heat treatment (MPa) | Relative corrosion fatigue life |
| Classification | | | Ferrite | Pearlite | Bainite + Martensite | | | | | |
| Inventive example 1 | 13.2 | 38 | 10 | 90 | 0 | 5.6 | 10.3 | 45 | 1,979 | 2.38 |
| Inventive example 2 | 12.0 | 39 | 5 | 95 | 0 | 3.8 | 9.4 | 58 | 1,997 | 2.75 |
| Inventive example 3 | 8.2 | 44 | 18 | 82 | 0 | 2.8 | 6.8 | 61 | 2,008 | 5.18 |
| Inventive | 5.1 | 56 | 7 | 93 | 0 | 1.7 | 3.1 | 68 | 1,983 | 11.4 |

TABLE 3-continued

| | Wire rod | | | | | | Steel wire | | |
| --- | --- | --- | --- | --- | --- | --- | --- | --- | --- |
| | | Charpy U-notch | Phase fraction (%) | | | Pearlite colony | Grain | Charpy U-notch | Tensile strength after quenching and tempering | Relative |
| Classification | Grain size (μm) | energy (J/cm$^2$) | Ferrite | Pearlite | Bainite + Martensite | size (μm) | size (μm) | energy (J/cm$^2$) | heat treatment (MPa) | corrosion fatigue life |
| Inventive example 5 | 6.4 | 51 | 37 | 63 | 0 | 2.2 | 4.5 | 67 | 2,051 | 7.30 |
| Comparative example 1 | 20.2 | 18 | 4 | 96 | 0 | 9.7 | 15.0 | 23 | 1,988 | 1.00 |
| Comparative example 2 | 19.1 | 29 | 3 | 97 | 0 | 9.4 | 13.4 | 28 | 1,994 | 0.96 |
| Comparative example 3 | 18.4 | 14 | 20 | 67 | 13 | 8.9 | 12.8 | 14 | 1,987 | 0.99 |

Comparative Examples 1 to 3 are described as Comparative examples because the alloy composition satisfies the proposal in the present disclosure but the manufacturing process conditions deviate from the present disclosure. Particularly, in Comparative Example 1, the heating temperature of the billet is 1,025° C., which is out of the range of 800 to 950° C., Comparative Example 2 has a finishing rolling temperature of 874° C., which is out of the range of 700 to 850° C., and in Comparative Example 3, the cooling rate after rolling is 5.8° C./s, exceeding 5° C./s.

FIGS. 1 and 2 are microstructure photographs taken with an Electron Backscatter Diffraction apparatus to measure the grain size of the wire rod in Comparative Example 1 and Inventive example 3, respectively.

Referring to FIGS. 1 and 2, while the grain size was coarse in the case of Comparative Example 1, it could be confirm that the average grain size is fine in Inventive example 3.

In addition, referring to Table 3, the grain size of the hot-rolled wire rod was in the range of 18.4 to 20.2 μm in the case of the Comparative examples, but it was 5.1~13.2 μm in the case of the Inventive examples, which was finer than that of the Comparative examples, and Charpy impact energy value is the level of 14 to 29 J/cm$^2$ in the case of the Comparative examples, but the high value of 38 to 56 J/cm$^2$ was shown in the case of the Inventive examples, and it could be confirm that toughness was improved.

Therefore, the wire rod obtained according to the alloy composition and manufacturing conditions proposed in the present disclosure has excellent toughness and may be suitably used for a spring.

On the other hand, in the case of Comparative Example 3, as a result of analyzing the microstructure of the wire rod, it was found that the transforming pearlite was not completed after ferrite was created, resulting in the creation of the hard structure such as bainite or martensite. This is because the cooling rate exceeded 5° C./s and it was not possible to secure sufficient time to complete the transforming pearlite.

FIGS. 3 and 4 are microstructure photographs taken with an Electron Backscatter Diffraction apparatus to measure the grain size of the steel wire in Comparative Example 1 and Inventive example 3, respectively.

Referring to FIGS. 3 and 4, it could be confirm that the crystal grains in the steel wire subjected to heat treatment were formed finely in Example 3 compared to Comparative Example 1.

In addition, referring to Table 3, the heat-treated steel wire exhibited tensile strength in the vicinity of 2,000 MPa in both a Comparative example and an Inventive example. The grain size was in the range of 12.8~15.0 μm in the case of the Comparative example, in the case of the Inventive example, it could be confirm that the grain size is 3.1 to 10.3 μm, which is significantly finer compared to the Comparative example.

FIG. 5 is a graph showing a correlation between grain size, toughness, and relative corrosion fatigue life of a wire rod for springs according to an embodiment of the present disclosure.

FIG. 6 is a graph showing a correlation between grain size, toughness, and relative corrosion fatigue life of a steel wire for springs according to an embodiment of the present disclosure.

Referring to FIGS. 5 and 6, it could be confirm that the smaller the average grain size of the hot-rolled wire rod and the steel wire for springs, the lower the Charpy impact energy value increases, and the relative corrosion fatigue life is improved.

Particularly, according to Table 3, the Charpy impact energy value was at the level of 14 to 28 J/cm$^2$ in the case of the Comparative examples, but it was a high value of 45 to 68 J/cm$^2$ in the case of the Inventive examples, and it may be confirm that toughness is improved. In addition, the relative corrosion fatigue life was 0.96 to 1.00 in the case of the Comparative examples, whereas it was 2.38 to 11.4 in the case of the Inventive examples, it could be confirm that the corrosion fatigue properties are significantly improved compared to the Comparative examples.

In the foregoing, exemplary Inventive examples of the present disclosure have been described, but the present disclosure is not limited thereto, and a person with ordinary knowledge in the relevant technical field does not depart from the concept and scope of the following claims. It will be appreciated that various changes and modifications are possible in.

The invention claimed is:

1. A wire rod for springs with improved toughness and corrosion fatigue properties, the wire rod comprising, by weight percent:
carbon (C): 0.4 to 0.7%,
silicon (Si): 1.2 to 2.3%,
manganese (Mn): 0.2 to 0.69%,
chromium (Cr): 0.2 to 0.8%, and
a balance of iron (Fe) and inevitable impurities, and wherein a grain size of ferrite and colony is 13.2 μm or less, wherein a grain size of the colony is 8.0 μm or less, and wherein a Charpy impact energy is 38 J/cm$^2$ or more.

2. The wire rod of claim 1, wherein a microstructure of the wire rod comprises by an area fraction, 5 to 37% of ferrite, and the remainder is a mixed structure comprising pearlite.

3. The wire rod of claim 2, wherein the wire rod further comprises one or more elements selected from among copper (Cu): 0.01 to 0.4 wt % and nickel (Ni): 0.01 to 0.6 wt %.

4. The wire rod of claim 1, wherein the wire rod further comprises one or more elements selected from among vanadium (V): 0.01 to 0.2 wt %, niobium (Nb): 0.01 to 0.1 wt %, titanium (Ti): 0.01 to 0.15 wt %, and molybdenum (Mo): 0.01 to 0.4 wt %.

5. The wire rod of claim 1, wherein the wire rod further comprises one or more elements selected from among copper (Cu): 0.01 to 0.4 wt % and nickel (Ni): 0.01 to 0.6 wt %.

6. The wire rod of claim 1, comprising, by weight percent, silicon (Si): 1.2 to 1.65%.

7. The wire rod of claim 1, comprising, by weight percent, silicon (Si): 1.2 to 1.52%.

8. The wire rod of claim 1, comprising, by weight percent, manganese (Mn): 0.56 to 0.69%.

9. The wire rod of claim 1, wherein the grain size of the colony is 1.7 to 5.6 μm.

10. A steel wire for springs with improved toughness and corrosion fatigue properties, the steel wire comprising, by weight percent:

carbon (C): 0.4 to 0.7%, silicon (Si): 1.2 to 2.3%, manganese (Mn): 0.2 to 0.69%, chromium (Cr): 0.2 to 0.8%, and a balance of iron (Fe) and inevitable impurities, and a grain size of ferrite and colony is 10.3 μm or less, a grain size of the colony is 8.0 μm or less, and a Charpy impact energy value is 45 J/cm$^2$ or more.

11. A wire rod for springs with improved toughness and corrosion fatigue properties, the wire rod consisting of, by weight percent:

carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities, wherein a grain size of ferrite and colony is 13.2 μm or less, wherein a grain size of the colony is 8.0 μm or less, and wherein a Charpy impact energy is 38 J/cm$^2$ or more.

12. A method of manufacturing the wire rod for springs with improved toughness and corrosion fatigue properties of claim 1, the method comprising: manufacturing a billet comprising, by weight percent: carbon (C): 0.4 to 0.7%, silicon (Si): 1.2 to 2.3%, manganese (Mn): 0.2 to 0.69%, chromium (Cr): 0.2 to 0.8%, and a balance of iron (Fe) and inevitable impurities;

heating the billet at 800 to 950° C.;

finishing rolling the heated billet at 700 to 1,100° C. and winding to manufacture a wire rod; and cooling the wire rod at a cooling rate of 4.8° C./s or less.

13. The method of claim 12, wherein the billet further comprises one or more elements selected from among vanadium (V): 0.01 to 0.2 wt %, niobium (Nb): 0.01 to 0.1 wt %, titanium (Ti): 0.01 to 0.15 wt %, and molybdenum (Mo): 0.01 to 0.4 wt %.

14. The method of claim 12, wherein the billet further comprises one or more elements selected from among copper (Cu): 0.01 to 0.4 wt % and nickel (Ni): 0.01 to 0.6 wt %.

15. The method of claim 12, wherein a cooling start temperature of the wire rod may be 820° C. or less.

16. A method of manufacturing the steel wire for springs with improved toughness and corrosion fatigue properties of claim 9, the method comprising: drawing a wire rod comprising, by weight percent: carbon (C): 0.4 to 0.7%, silicon (Si): 1.2 to 2.3%, manganese (Mn): 0.2 to 0.8%, chromium (Cr): 0.2 to 0.8%, and a balance of iron (Fe) and inevitable impurities to manufacture the steel wire;

austenitizing the steel wire by heating the steel wire in a range of 850 to 1,000° C. and then maintaining it for at least 1 second; and quenching the austenitized steel wire in a range of 25 to 80° C. and tempering in a range of 350 to 500° C.

\* \* \* \* \*